United States Patent [19]

Morimoto et al.

[11] 4,417,319

[45] Nov. 22, 1983

[54] ELECTRONIC TRANSLATOR FOR PROVIDING ADDITIONAL SENTENCES FORMED BY DIRECTLY-TRANSLATED WORDS

[75] Inventors: Masafumi Morimoto, Yamatokoriyama; Kunio Yoshida; Tosaku Nakanishi, both of Nara, all of Japan

[73] Assignee: Sharp Kabushiki Kaisha, Osaka, Japan

[21] Appl. No.: 252,144

[22] Filed: Apr. 8, 1981

[30] Foreign Application Priority Data

Apr. 15, 1980 [JP] Japan .................................. 55-51062

[51] Int. Cl.³ ............................................ G06F 15/38

[52] U.S. Cl. ..................................................... 364/900

[58] Field of Search ........................ 364/900, 200, 419; 433/157

[56] References Cited

U.S. PATENT DOCUMENTS

| | | | |
|---|---|---|---|
| 4,130,882 | 12/1978 | Swanstrom et al. | 364/900 |
| 4,158,236 | 6/1979 | Levy | 364/900 |
| 4,339,806 | 7/1982 | Yoshida | 364/900 |

*Primary Examiner*—David H. Malzahn

*Attorney, Agent, or Firm*—Birch, Stewart, Kolasch & Birch

[57] ABSTRACT

An electronic translator comprises an input device for entering one or more first words, a memory device for storing second words equivalent to the first words, an access device for addressing the memory device to cause retrieval of second words equivalent to the input first words, the access means maintaining the order of the second words identical to that of the input first words, and an indicating device responsive to the access device for indicating this kind of order of the second words.

4 Claims, 17 Drawing Figures

| H \ L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A | B | C | D | E | F | G | H | I | J | K | L | M | N | O | P |
| 1 | Q | R | S | T | U | V | W | X | Y | Z | , | — | . | : | ... | → |
| 2 | AN | BA | BE | BO | BU | CA | CH | CK | CL | COM | CON | CO | DA | DE | DI | DO |
| 3 | EN | EX | FA | FE | FI | FO | FUL | GE | GH | GO | HA | HE | HI | HO | IN | KE |
| 4 | KI | LA | LE | LI | LO | LY | MA | ME | MI | MO | MU | ND | NE | NG | NI | NO |
| 5 | NT | ON | PA | PE | PI | PO | PU | RA | RE | RI | RO | SA | SE | SH | SI | SO |
| 6 | ST | SU | TA | TE | TH | TI | TO | TU | TY | UN | VE | VI | WA | WE | WI | WO |
| 7 | 0 | 1 | 2 | 3 | 4 | 5 | 6 | 7 | 8 | 9 | $ | $C_0$ | $C_1$ | $C_2$ | $C_3$ | $C_4$ |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | $C_5$ |

FIG. 6

| 8 | 7 6 5 4 3 2 1 BIT |
|---|---|
| 1 | A |
| 1 | N |
| 0 | AN |
| 1 | B |
| 1 | A |
| 0 | BA |
| 1 | B |
| 1 | E |
| 0 | BE |
| 1 | B |
| 1 | O |
| 0 | BO |
| 1 | B |
| 1 | U |
| 0 | BU |
| 1 | C |
| 1 | A |
| 0 | CA |
| 1 | C |
| 1 | H |
| 0 | CH |
| 1 | C |
| 1 | K |
| 0 | CK |
| 1 | C |
| 1 | L |
| 0 | CL |
| 1 | C |
| 1 | O |
| 1 | M |
| 0 | COM |
| 1 | C |
| 1 | O |
| 1 | N |
| 0 | CON |
| 1 | C |
| | ⋮ |

| | | |
|---|---|---|
| | ⋮ | |
| 1 | T | |
| 1 | H | |
| 0 | TH | |
| 1 | T | |
| 1 | I | |
| 0 | TI | |
| 1 | T | |
| 1 | O | |
| 0 | TO | |
| 1 | T | |
| 1 | U | |
| 0 | TU | |
| 1 | T | |
| 1 | Y | |
| 0 | TY | |
| 1 | U | |
| 1 | N | |
| 0 | UN | |
| 1 | V | |
| 1 | E | |
| 0 | VE | |
| 1 | V | |
| 1 | I | |
| 0 | VI | |
| 1 | W | |
| 1 | A | |
| 0 | WA | |
| 1 | W | |
| 1 | E | |
| 0 | WE | |
| 1 | W | |
| 1 | I | |
| 0 | WI | |
| 1 | W | |
| 1 | O | |
| 0 | WO | |
| 1 | 1 1 1 1 1 1 1 | ← $C_6$ |

FIG. 7

| | |
|---|---|
| 1 | W |
| 0 | H |
| 0 | EN |
| 1 | SH |
| 0 | O |
| 0 | U |
| 0 | L |
| 0 | D |
| 1 | I |
| 1 | 1 1 1 0 1 0 ← $C_{11}$ |
| 0 | CH |
| 0 | E |
| 0 | CK |
| 1 | 1 1 1 0 1 0 ← $C_{11}$ |
| 0 | IN |
| 1 | 1 1 1 1 0 0 ← $C_8$ |

WHEN SHOULD I (CHECK IN)?

| | |
|---|---|
| 1 | 1 1 1 1 0 1 1 ← $C_{12}$ |
| 0 | ト |
| 0 | ウ |
| 0 | キョ |
| 0 | ウ |
| 1 | ユ |
| 0 | キ |
| 0 | ノ |
| 1 | キ |
| 0 | ッ |
| 0 | プ° |
| 1 | が |
| 1 | 1 1 1 0 1 0 ← $C_{11}$ |
| 0 | 2 |
| 1 | マ |
| 0 | イ |
| 1 | ホ |
| 0 | シ |
| 0 | イ |
| 1 | 1 1 1 1 1 1 0 ← $C_7$ |

(トウキョウ)ユキノ キップ ガ (2)マイ ホシイ．

| | | | | | | | | |
|---|---|---|---|---|---|---|---|---|
| 1 | 1 | 1 | 1 | 1 | 0 | 1 | 0 | $C_{11}$ |
| 0 | ミ | | | | | | | |
| 0 | ル | | | | | | | |
| 0 | ク | | | | | | | |
| 1 | ヲ | | | | | | | |
| 0 | モ | | | | | | | |
| 0 | ウ | | | | | | | |
| 0 | ス | | | | | | | |
| 0 | コ | | | | | | | |
| 0 | シ | | | | | | | |
| 1 | ク | | | | | | | |
| 0 | ダ゛ | | | | | | | |
| 0 | サ | | | | | | | |
| 0 | イ | | | | | | | |
| 1 | 1 | 1 | 1 | 1 | 1 | 1 | 0 | $C_7$ |

(ミルク)ヲ モウスコシ クダサイ.

ELECTRONIC TRANSLATOR FOR PROVIDING ADDITIONAL SENTENCES FORMED BY DIRECTLY-TRANSLATED WORDS

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional electronic devices in that the former is of a unique structure which provides for efficient and rapid retrieval of word information stored in a memory.

Some conventional translators have the capability of translating an original sentence having words to another sentence of words represented in another language. However, a limitation is that the original sentence is necessarily stored in a memory of the translator for the purpose of retrieval of the translated sentence. Therefore, when a sentence not stored in the memory is inputted for translating purposes, words forming the input sentence may be directly translated so that translated words are then in the order in which the original words are aligned. Obtaining proper grammatical form of the translated words and rearrangement into proper order of the translated words are not enabled in the conventional translator.

In such a case, therefore, it is desirable to provide an indication or alarm representing that no grammatical amendment nor rearrangement is conducted.

SUMMARY OF THE INVENTION

Accordingly, it is an object of the present invention to provide an improved electronic translator for providing an indication or an alarm representing that no grammatical amendment nor rearrangement of translated words generated in response to input of original words in conducted.

Briefly described, an electronic translator of the present invention comprises an input device for entering first words, a memory device for storing second words equivalent to the first words, an access device for addressing the memory device to cause retrieval of the second words, the access means allowing that the order of the second words is identical to that of the first words, and an indicating device responsive to the access device for indicating such an order of the second words.

BRIEF DESCRIPTION OF THE DRAWINGS

The present invention will be more fully understood from the detailed description given hereinbelow and accompanying drawings which are given by way of illustration only, and thus are not limitative of the present invention and wherein:

FIGS. 4(*b*) through 4(*d*) show formats of various types of ROM, the ROM being connectable to the circuit of FIG. 2;

FIG. 6 shows a table representing letters, compression codes, and control codes used in the word data region WC of FIG. 5;

FIG. 7 shows a detailed format of a compression table in the format of FIG. 4(*a*);

DESCRIPTION OF THE INVENTION

First of all, any kind of language can be applied to an electronic translator of the present invention. An input word is spelled in a specific language to obtain an equivalent word, or a translated word, spelled in a different language corresponding thereto. The languages can be freely selected.

Figure 1:
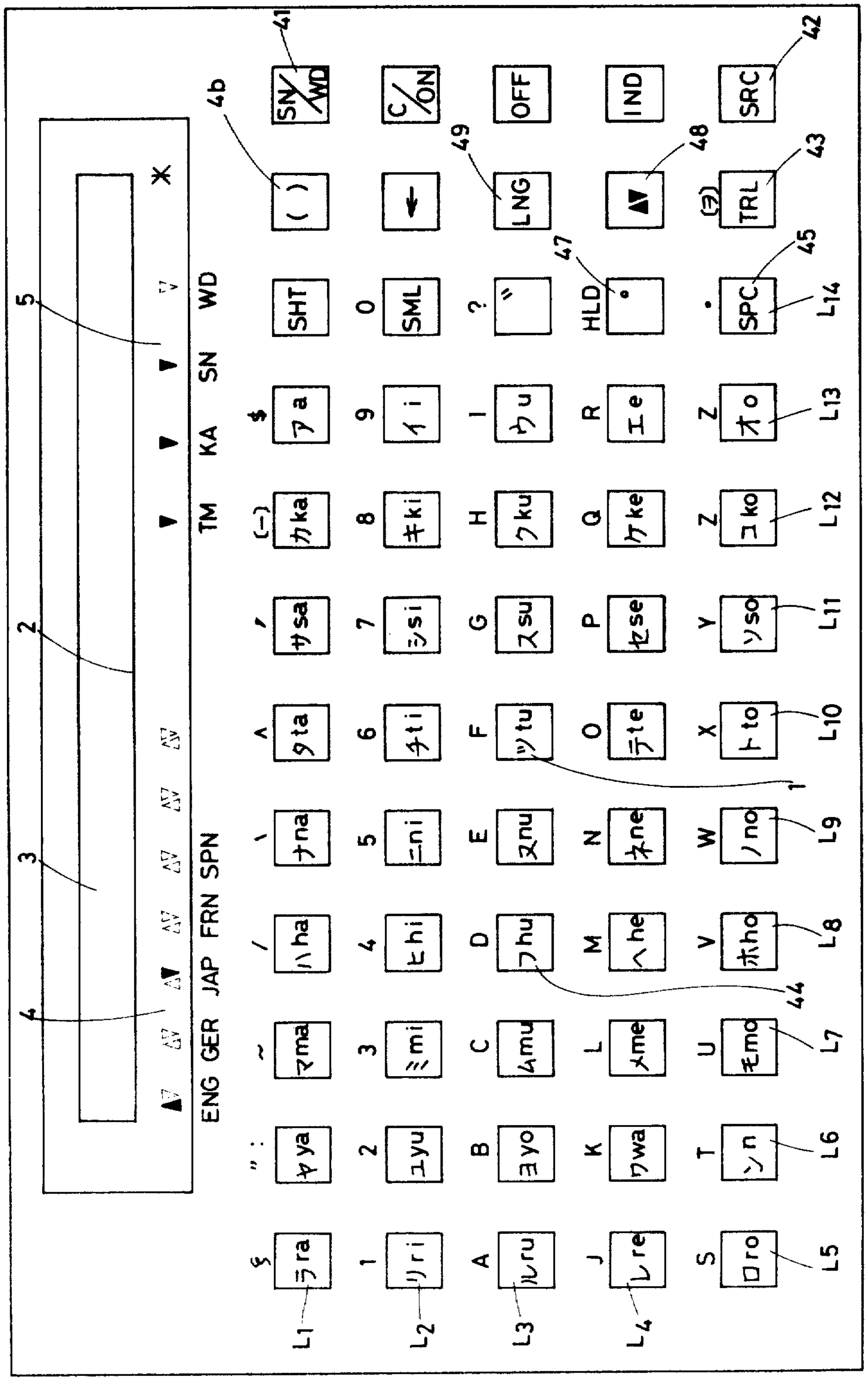
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character display 3, a language or tongue indicator 4 and a symbol indicator 5.

The display 3 shows characters processed by the translator. The language or tongue indicator 4 shows symbols used for representing the mother tongue and the foreign tongue processed by the translator. The symbol indicator 5 shows symbols used for indicating operated conditions in the translator.

Figure 2:
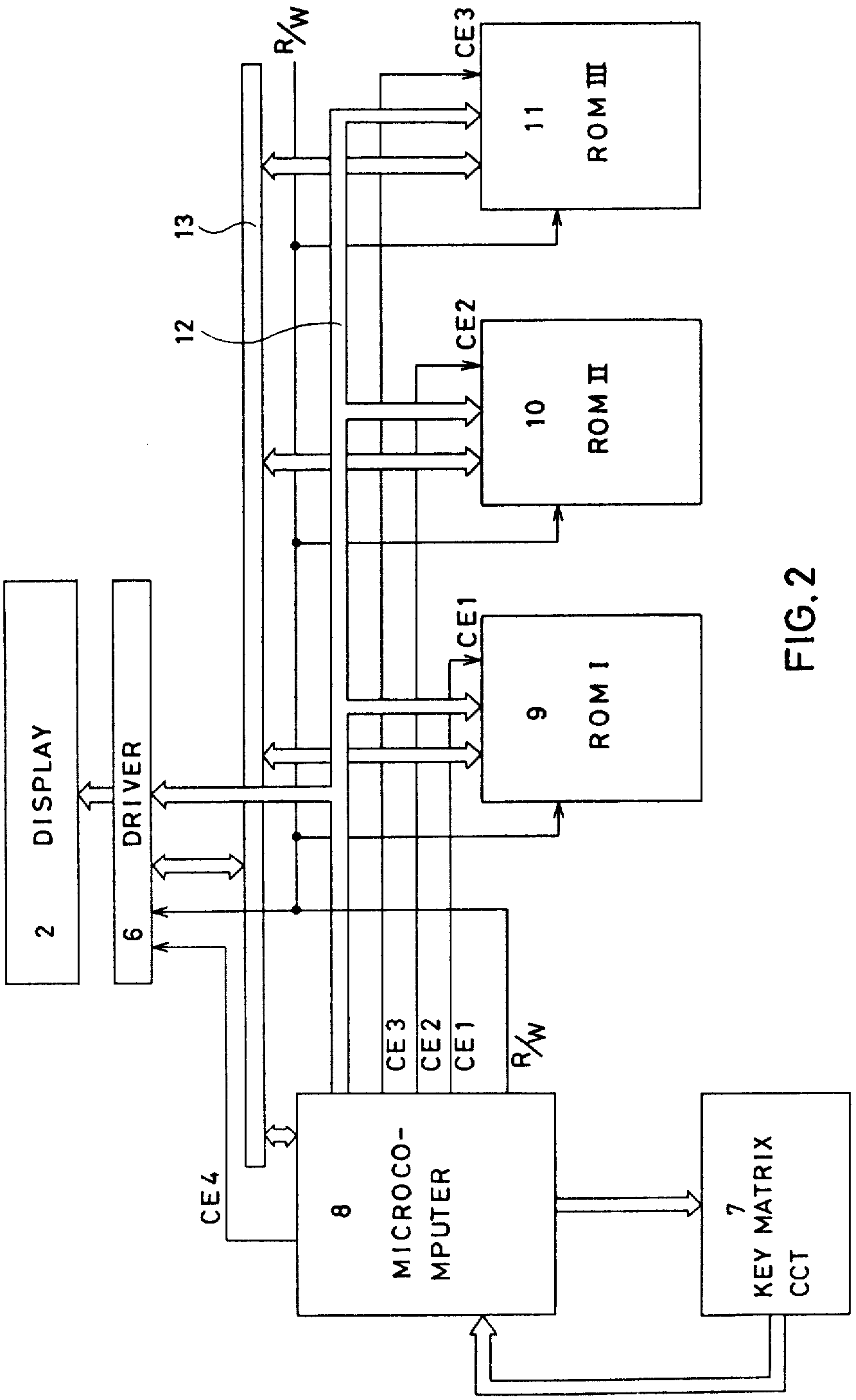
FIGS. 2,3(*a*) and 3(*b*) show block diagrams of a control circuit implemented within the translator as shown in FIG. 1.

FIG. 2 shows a block diagram of a control circuit implemented in the translator. The circuit comprises the indicator 2, a driver 6, a key matrix circuit 7, a microcomputer 8, a ROM I 9, a ROM II 10, and ROM III 11. The circuit 7 functions for the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferred form of the present invention, each of ROMs 9 to 11 corresponds to one language. For example, the ROM I 9 stores a plurality of English words, the ROM II 10 stores a number of Japanese words and the ROM III 11 stores a number of German words. Preferably, the ROM I 9 is built into the translator so that it cannot be removed from the translator for exchange purposes. However, each of ROM II 10 and ROM III 11 can be removed from the translator and replaced by another type of ROM as modules.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting a read or write operation.

Figure 3:
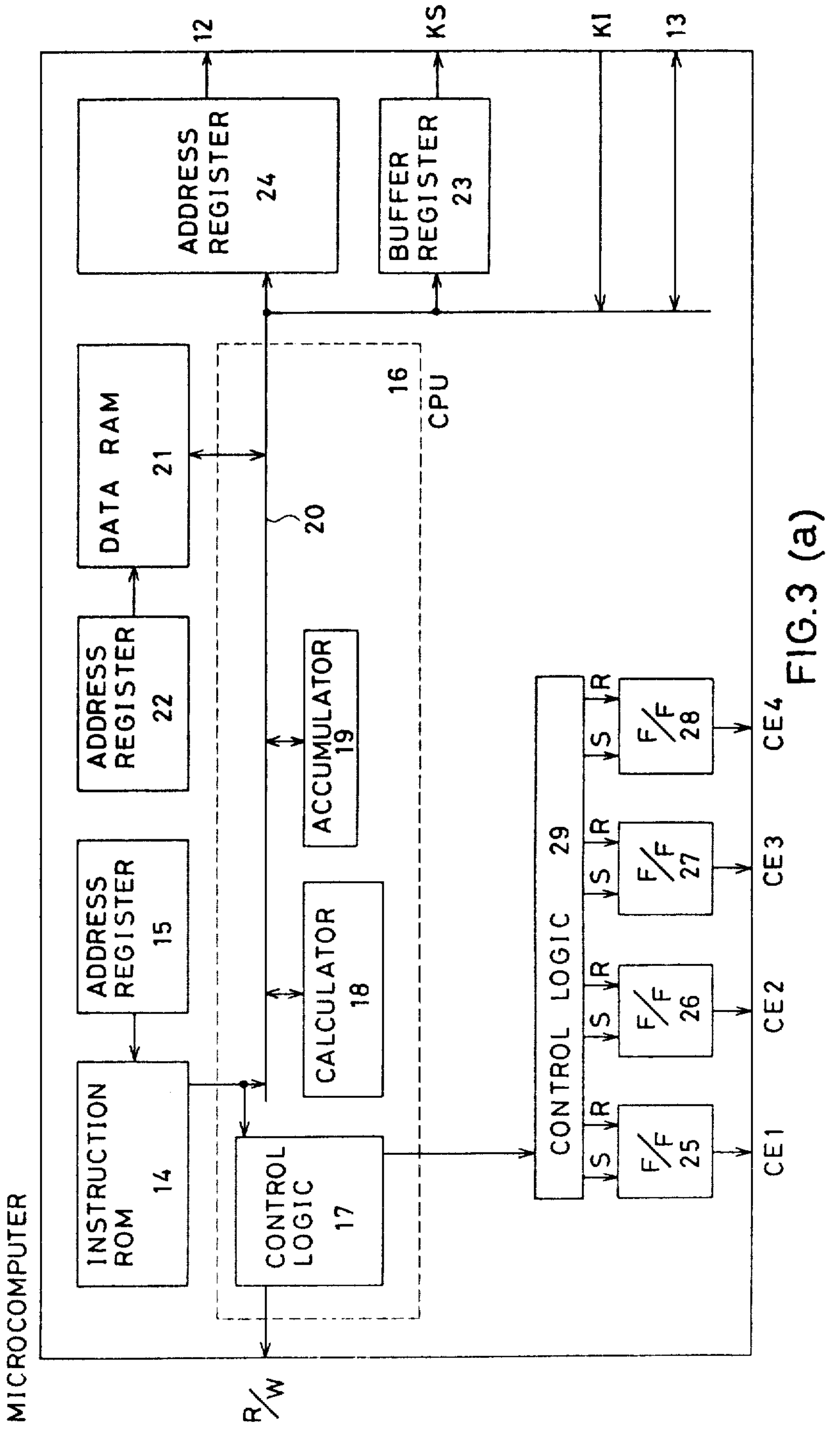
Figure 3:
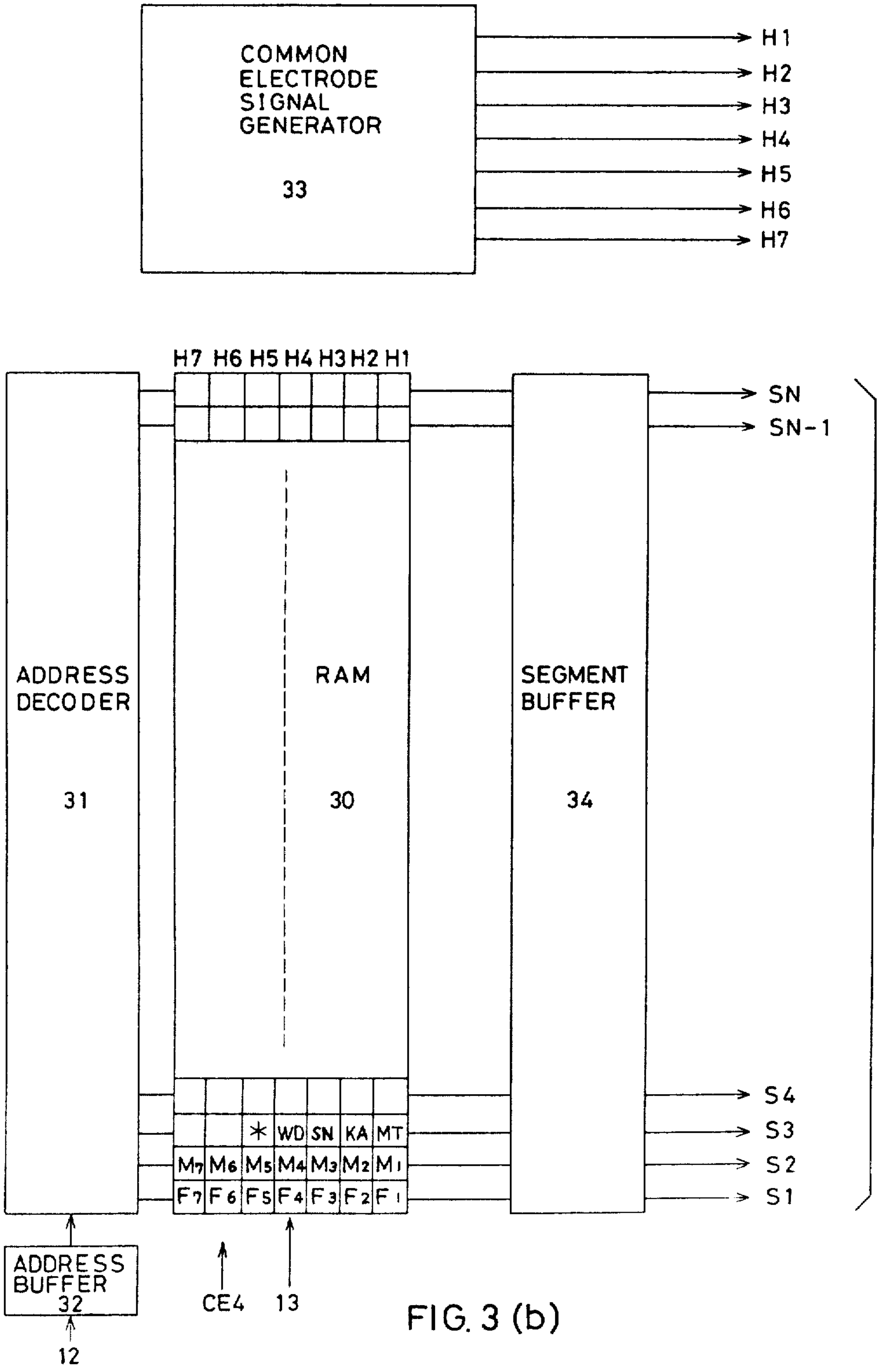

FIG. 3(*a*) shows a block diagram of the microcomputer 8 of FIG. 2. An instruction ROM 14 stores a number of kinds of instructions each of which is used for a specific operation of the translator and is, preferably, in coded format. As the address of a ROM address register 15 is in turn advanced, the ROM 14 provides a specific kind of instruction. The specific instruction is applied to a CPU 16 so that the CPU 16 responds to the instruction to provide its selected operation.

The CPU 16 comprises a control logic 17, a logic calculator 18, and an accumulator 19. An inner data bus is indicated by numeral 20. Date RAM 21 is provided for preliminarily containing data used for the translator and for functioning as a conditional flip flop used for a branch in a program operation. Data from the CPU 16 are stored in a specific location of the data RAM 21 which is selected by a RAM address register 22. The data stored in such a location of the RAM 21 are developed to the CPU 16.

Numeral 23 represents an output buffer register for outputting key strobe signals KS to the key matrix circuit 7 and the output of circuit 7 is applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to selectively increment or decrement a certain address is carried out by the CPU 16. since the CPU 16 is coupled to the data bus 13 as shown in FIG. 2, transmission of the data between the CPU 16 and the external memory is via the data bus 13. Direction of transmission of the data between them is defined with the read write signal R/W.

Each of flip flop circuits 25 to 28 is set or reset by a control logic 29. The control logic 29 is controlled by the CPU 16. The output of each of the flip flops 25 to 28 is referred to as chip selection signals $CE_1$ to $CE_4$.

FIG. 3(*b*) shows a block diagram of the driver 6 of FIG. 2. According to a preferred form of the present invention, the indicator 2 comprises a liquid crystal display. The character display 3 is formed as a $5\times7$ dot matrix for each single digit. The tongue indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1 " is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is made dark.

In FIG. 3(b), $S_1$, $S_2$ and $S_3$ are segment electrode signals used for illuminating symbols.$S_4$ to $S_N$ are segment electrode signals used for indicating characters. $H_1$ to $H_7$ represent common electrode signals. $M_1$ to $M_7$ represent a symbol " ▲ " for the tongue indicator 4, the symbol indicating the mother tongue or the original tongue which is not to be translated with the translator of the present invention. $F_1$ to $F_7$ represent another symbol " ▼ " of the same indicator 4, this symbol indicating the foreign tongue or the translated tongue which is to be translated with the translator of the present invention.

Further in FIGS. 3(*b*), suffixes 1 to 7 refer to English, German, Japanese, French, Spanish, another language "O", and further language "Δ", respectively. MT indicates a multivocal word. KA indicates a Japanese "Katakana" letter. SN represents a sentence while WD represents a word. A star "*" indicates that each of the words represented in the mother tongue or the original tongue is translated to each of the corresponding words represented in the foreign tongue or the translated tongue while grammatical correction or other modification of the foreign tongue is not carried out.

The driver 6 provides displaying signals to the indicator 2 when displaying data developed from the microcomputer 8 to apply them to the RAM 30. since the driver 6 is conventional, further description is omitted.

Figure 4:
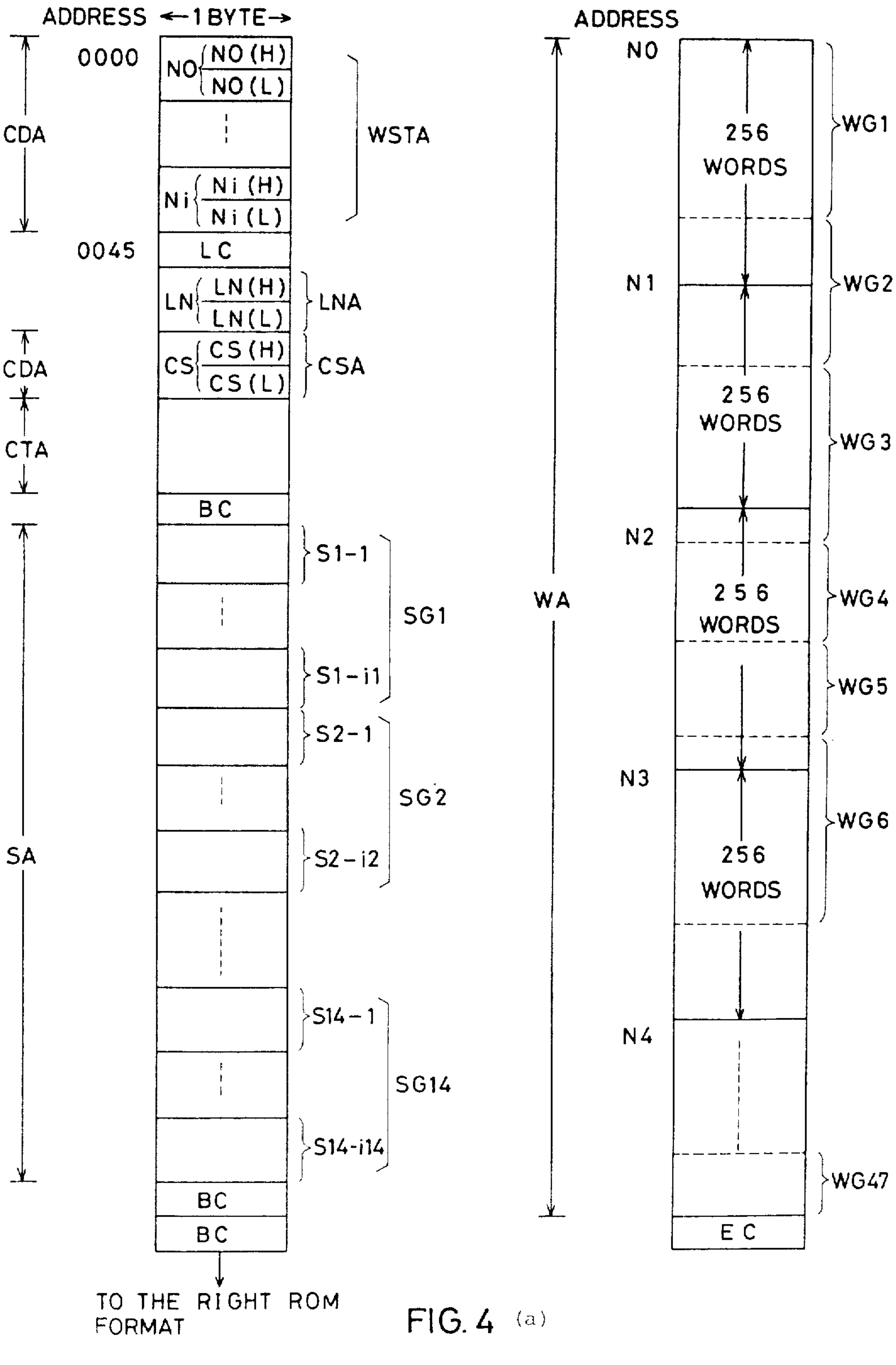
FIG. 4(*a*) show a format of a ROM for memorizing words, the ROM being connected in the circuit of FIG. 2.
Figure 4D:
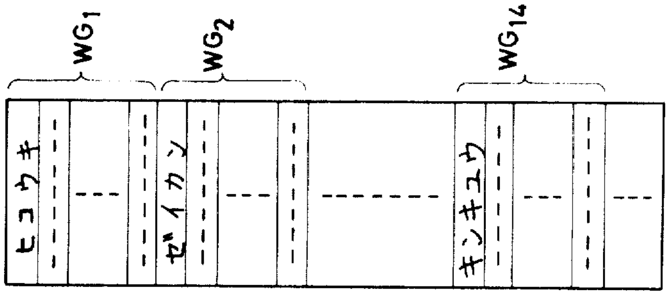
Figure 4C:
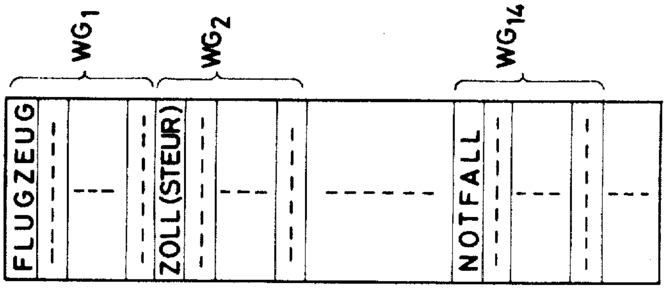
Figure 4B:
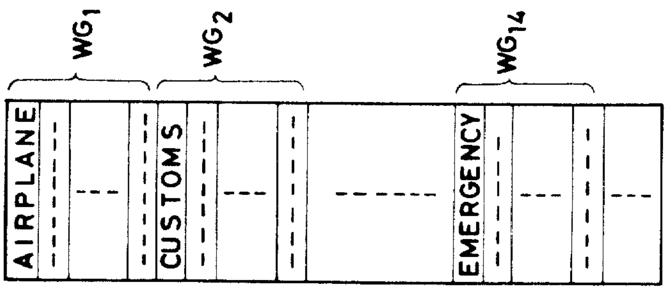

FIG. 4(*a*) shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of common spellings of English words is determined to detect some English spellings having high frequency in occurrence. Each thus selected English spelling is changed to corresponding compression codes for memorizing or storage purposes. The data-compression table CTA stores data representing correspondence between the selected spelling and the compression codes.

When correspondence between an input word and one or more words memorized in one of the ROMs is to be detected, the input word is changed to codes inclusive of one of the compression codes according to the contents of the data-compression table CTA since each of the ROMs stores codes which may include one of the compression codes. The table CTA is used to show words stored in one of the ROMs by changing the codes to the original spelling. The specific nature of this table may differ depending on the kind of language to make the degree of data compression the greatest.

In the presently disclosed example, stored words are classified as 47 categories in each of which a number of words are ordered. In FIG. 4(*a*), a word category n is referred to as WGn. Sentences are formed by a combination of a plurality of stored words. These sentences are classified as 14 categories in each of which a number of sentences are ordered. In FIG. 4(*a*), a sentence category m is referred to as SGm containing a first sentence $S_{m\text{-}1}$ to a last sentence $S_{m\text{-}im}$. Each of the word categories WG1 to WG14 corresponds to the respective sentence categories SG1 to SG14.

The following table shows a relation between the number of the category and the name of the category.

TABLE 1-1

| The number of the category | corresponding key | the name of the category |
|---|---|---|
| 1 | "ra" or "♀" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |

TABLE 1-1-continued

| The number of the category | corresponding key | the name of the category |
|---|---|---|
| 14 | "SPC" or "o" | emergency |

Each category of words contains 256 words. A first word address table region WSTA contains a first address referred to as $N_0$, $N_1$, $N_2$, . . . $N_4$ in FIG. 4(*a*). This first address is related to a location in which first codes or first compressed codes for representing the first word is stored. In accordance with a specific example of the present invention, each address is represented with two bytes. Each first address is separated to an upper byte referred to as No(H) to Ni(H) and a lower byte referred to No(L) to Ni(L). The first word address table region is used to shorten retrieval time for a specific word.

CS refers to a first sentence address CS(H) and CS(L) which is stored in a first sentence address region CSA. LNA indicates a memory location for storing a number of a word indicating the kind of a specific tongue as referred to LN of LN(H) and LN(L). More particularly, as the ROM storing English words is concerned, a word "English" is necessarily contained in that ROM. In such a case, the number of the word "English" in the ROM is LN starting from the first word of the group. Memorizing the number LN is suitable for indicating the mother tongue and the foreign tongue being selected in the character indicator 3 and it is unnecessary to additionally memorize a word showing the kind of tongue.

The translator of the present invention may comprise audible sound generating means for developing words represented in the mother tongue and/or the foreign tongue. Since such an audible sound generating means is disclosed in, for example, Hyatt U.S. Pat. No. 4,060,848 issued Nov. 29, 1979, further description is omitted.

In FIG. 4(*a*), LC indicates a tongue code in which upper 4 bits indicate a subject of language stored in the ROM and lower 4 bits the particular language stored in the ROM. In particular, there may be present a ROM for storing words related to economy, engineering or medicine, respectively. Information representing such a subject is stored in LC. The lower 4 bits corresponds to languages as follows:

TABLE 1-2

| The lower 4 bits | language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "o" |
| 0 1 1 1 (7) | a further tongue "▲" |

In FIG. 4(*a*), BC, "11111111" is a boundary code and EC "11111111" is an end code of the ROM.

FIGS. 4(*b*) through 4(*d*) show formats of word categories in various ROMs containing English words, German words and Japanese words, respectively. These category words are featured in that each first word stored in each category is the name of each category.

Figure 5:
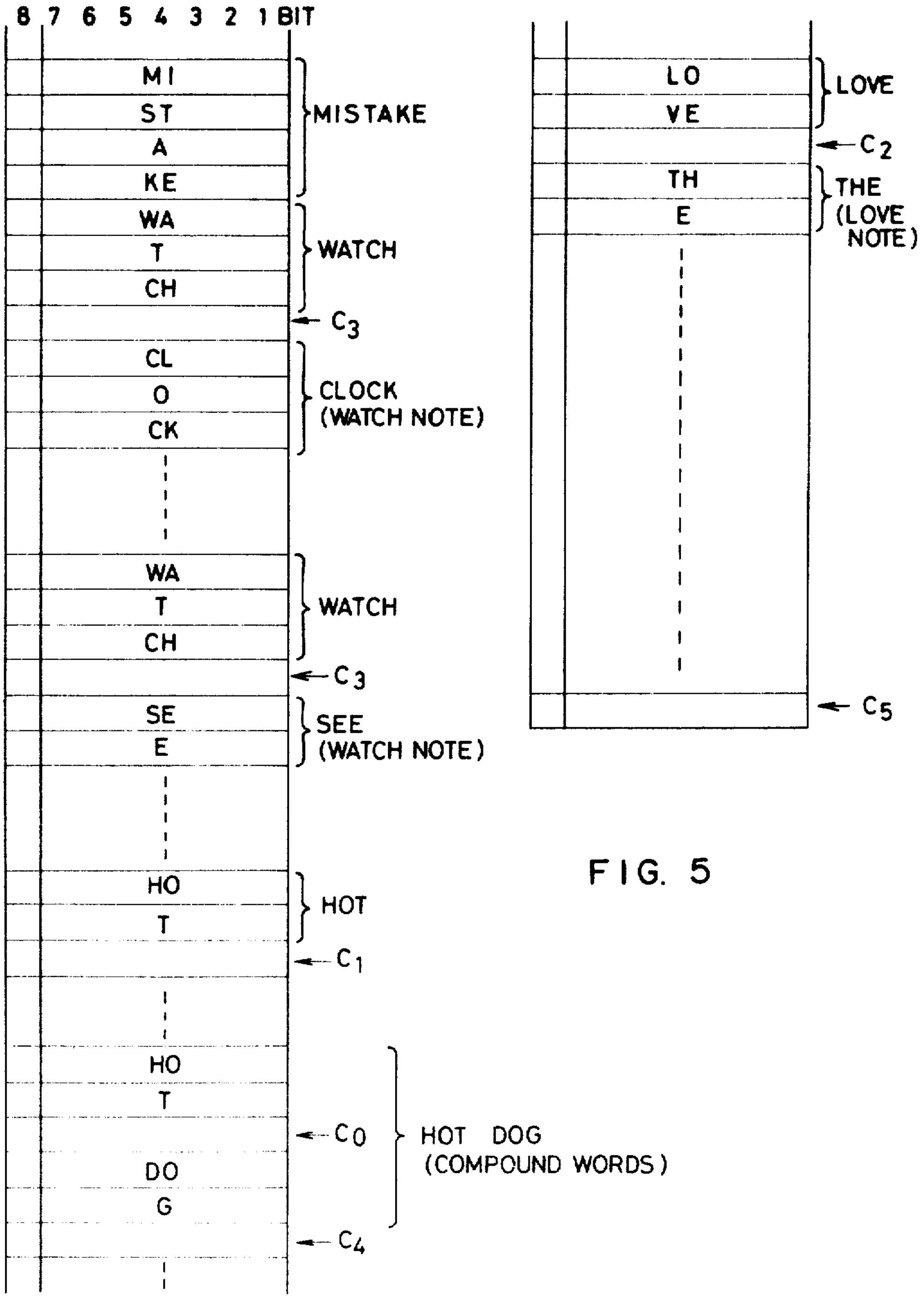
FIG. 5 shows a detailed format of a word data region WC in the format of FIG. 4(*a*)
Figure 8A:
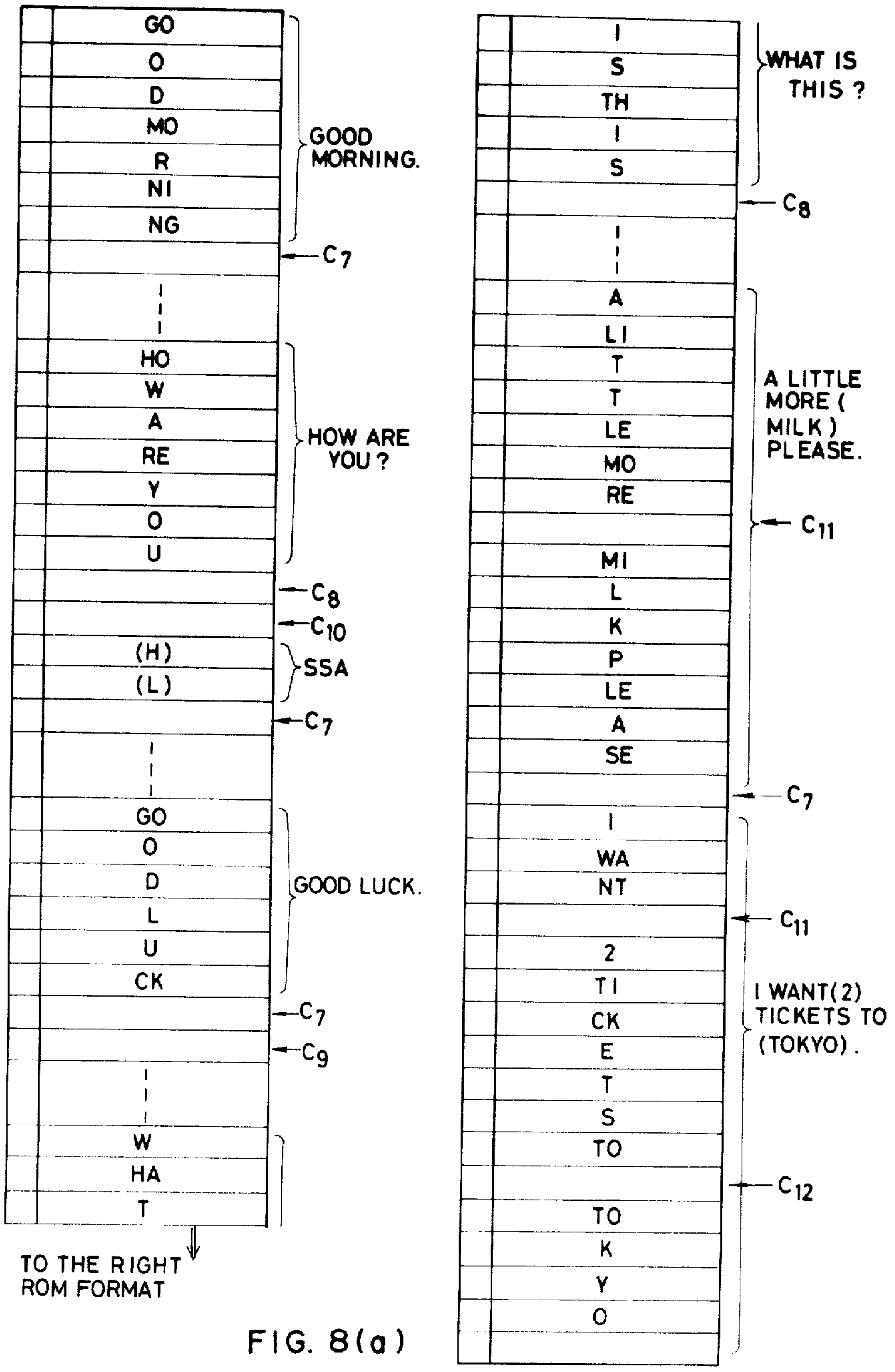
FIGS. 8(*a*) through 8(*d*) show detailed formats of a sentence data region SA in the format of FIG. 4 (*a*)
Figure 8B:
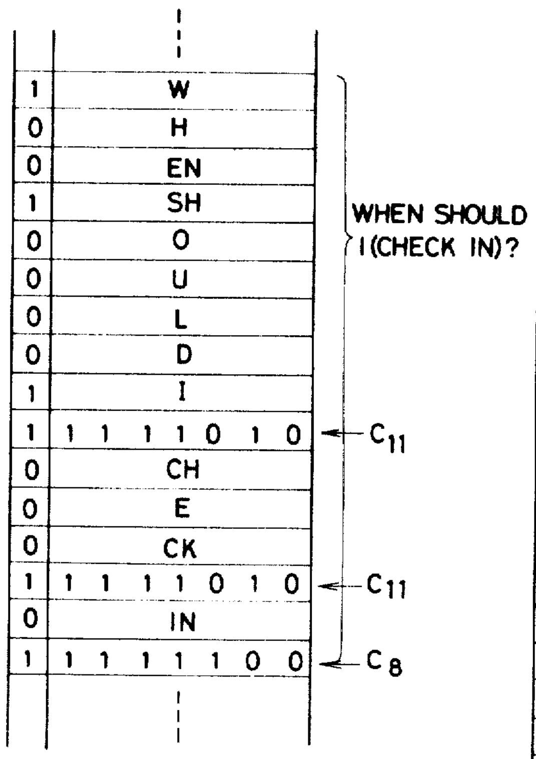
Figure 8C:
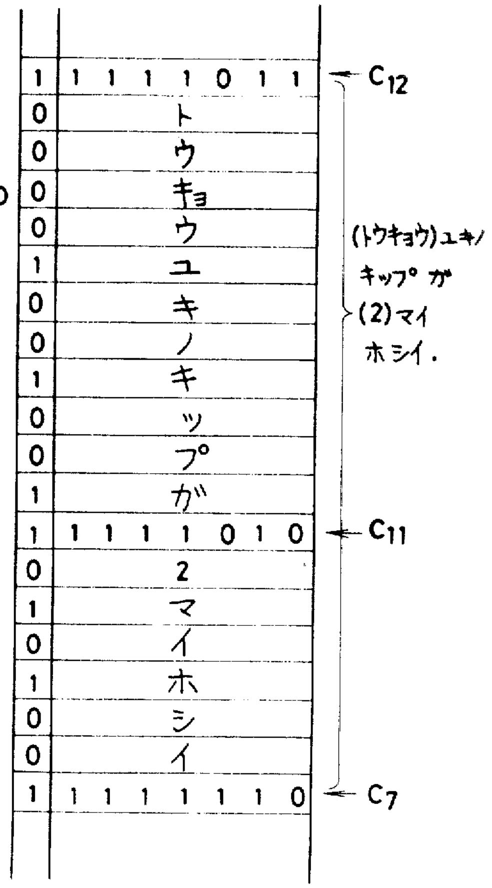
Figure 8D:
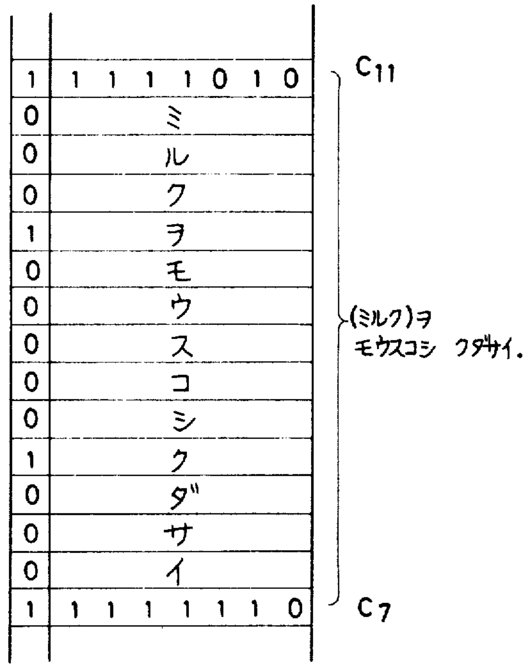

FIG. 5 shows a detailed format in a word data region WA in the format of FIG. 4(*a*) where the ROM stores English words.

In the word data region WA, word data are ordered in units of 1 byte. The eighth bit of the first word in each word category is defined as "1" while the eighth bit of the second and subsequent words is defined as "0". The first bit through the seventh bit are used to contain letter codes representing letters or compression codes representing letters in compressed form. For example, a word "WATCH" is memorized such that a pair "WA" are represented by a single compression code of 1 byte, a pair "CH" are represented by another type of single compression code of 1 byte and a letter "T" is represented a letter code of 1 byte. Therefore, five letters of "WATCH" are stored with three bytes.

Each word has a specific meaning and corresponds to a translated word. Words identical with another in spelling and a homonym, which is identical in spelling and pronunciation, are each stored with a note for identification. FIG. 5 represents a word "WATCH" having two meanings of "CLOCK" and "SEE" so that each note is added as "WATCH (CLOCK)" and "WATCH (SEE)" with a bracket. These notes each follow a note code $C_3$ (7E in a hexadecimal notation) in the word data region. The bracket for the note normally follows the noted word. But, it may precede the noted word in which case the note follows the note code $C_2$ (7D in the nexadecimal notation). In FIG. 5, a note "THE" for a word "LOVE" is provided to be "(THE)LOVE".

A compound word formed by at least two words corresponds to each translated word. FIG. 5 shows an example of a compound word "HOT DOG". Between the two words "HOT" and "DOG", a space code Co (7B in the hexadecimal notation) is inserted. If at least one of the two words is memorized in one of the ROMs and is the first word of the compound, the last letter code of the word (the compression code) is followed by a compound code $C_1$ (7C in the hexadecimal notation). The word "HOT" in FIG. 5 is this type of word to thereby be followed by the compound code $C_1$. The compound code $C_1$ is to indicate that there are present one or more compounds starting with the word "HOT".

As described above, the stored words are classified as 47 categories. A category separation code $C_4$ (7F in the hexadecimal notation) is provided for showing separation between categories. This code follows all the words in the same category. In FIG. 5, this code follows the compound "HOT DOG". At the end of the word data region WA, an end code $C_5$ (FF in the hexadecimal notation) is provided.

FIG. 6 shows a table containing the letter codes, the compression codes, and the control codes each of which is used in the format of FIG. 5.

In the word data region, each of the word data occupies 1 byte. It is possible to provide 256 combinations with one kind of data of eight bits. But, the eighth bit is used to indicate the first word. The remaining seven bits can be selectively combined to provide 128 combinations of data.

The codes in the shaded parts in the table of FIG. 6 are the figure codes, the symbol codes, and the control codes all of which are used in common with the respective tongues. In the remaining parts, the letter codes (alphabets in FIG. 6) and the compression codes are provided. The control codes $C_0$ to $C_5$ function as described in FIG. 5.

FIG. 7 shows a detailed format of the compression table, related to the English words, in the format of FIG. 4(*a*). The format of FIG. 7 corresponds to the compression table of FIG. 6.

In FIG. 7, the lower seven bits with the eighth bit of "1" represent a letter as the letter code. The lower seven bits with the eighth bit of "0" is the compression code for the preceding letter codes. An end code $C_6$ is provided for representing the end of the compression codes. The kind of compression table differs, depending on the type of tongue so as to achieve the highest efficiency.

FIG. 8(*a*) through 8(*d*) show detailed formats of the sentence data region SA in the format of FIG. 4(*a*) related to English or Japanese.

A plurality of words form a sentence wherein each of the words is memorized with the compression code.

At the start of a word, the eighth bit is represented as "1". Some letter codes or compression codes representing a particular word are contained before next occurrence of the eighth bit of "1". For separation of the sentences, two types of codes $C_7$ and $C_8$ are used in which $C_7$ is added following an affirmative sentence and $C_8$ is added following an interrogative sentence. The code $C_7$ is "FE" in the hexadecimal notation and $C_8$ is "FC" in the same.

As described above, the memorized sentences are classified as 14 categories. A category separation code $C_9$ is used for indicating separation between the categories. The code $C_9$ is represented as "FF" in the hexadecimal notation. This code $C_9$ follows the code $C_7$ or $C_8$. FIG. 8(*a*) shows a sentence "GOOD LUCK." which is memorized at the end of a particular sentence category.

It may be possible that the same sentence is included in two or more categories. In such a case, to reduce the number of bytes for the memory, the sentence is memorized as such in one category while the leading address of the stored sentence in this category is memorized in another type of category. An address memory code $C_{10}$ (FD in the hexadecimal notation) is used for this control purpose. Two bytes following the code $C_{10}$ are used to memorize an address "SSA" for the code (compression code) of the leading letter of the first word contained in the sentence which is in common.

As a feature of the translator according to the present invention, one or more words in an exemplary sentence in an original language can be altered to form another type of sentence in the original language. The thus modified sentence is translated. Such words which can be altered are provided with brackets in a displayed form. At most, two words can be altered in a single sentence as shown in FIG. 8(*a*).

FIG. 8(*a*) shows an exemplary sentence of "A LITTLE MORE (MILK) PLEASE.". A word provided within brackets is specified by a bracket code $C_{11}$ (FA in the hexadecimal notation). With the eight code of "0" following this code $C_{11}$, the lower seven codes are the letter codes (the compression code). When two words are to inserted within the brackets as being a phrase or an idiom, the code $C_{11}$ is inserted between the words. For example, a phrase of "CHECK IN" is inserted between the words to thereby form a code line of "Code $C_{11}$, CHECK, Code $C_{11}$, IN" as indicated in FIG. 8(*b*).

FIG. 8(*a*) shows another example, say, "I WANT (2) TICKETS TO (TOKYO)." when represented in English. (2) is represented by use of the code $C_{11}$ while (TOKYO) is represented by use of another bracket code $C_{12}$ (FB in the hexadecimal notation). The code $C_{11}$ need not necessarily precede the code $C_{12}$. FIG. 8(*c*) shows an example represented in Japanese. As indicated in FIG. 8(*c*), the code $C_{12}$ precedes the code $C_{11}$ since the order of words is different between English and Japanese.

In this type of translator, the first brackets in an English sentence are represented with the code $C_{11}$ and the second brackets in the English sentence are represented with the code $C_{12}$. In another language, the first brackets in the English translated sentence are represented with the code $C_{11}$ and the second brackets in the English translated sentence are represented with the code $C_{12}$. When only one bracket pair is used in a sentence, the code $C_{11}$ is necessarily used.

[OPERATION OF THE TRANSLATOR]

(1) Display:

With reference to FIG. 1, the letter indicator 3 displays English letters, Japanese "Katakana" letters, figures and symbols. The kind of tongue indicator 4 displays the marks "▲" and "▼". The symbol indicator 5 contains the symbols MT, KA, SN and WD specified with the symbol "▼", and the star "*". Indication of these symbols is enabled with control of the driver 6 by developing corresponding data from the microcomputer 8.

(2) Translation principle:

The system of FIG. 2 has the capability of translating three kinds of languages to one to another. A specific type of ROM memorizes a great number of words and sentences as shown in FIG. 4(*a*). Each of the words and sentences corresponds to respective translated words and translated sentences. This correspondence is assured by the numbering of words and sentences which are in common between the ROMs. More particularly, a specific sentence "GOOD MORNING." is assumed to be memorized as the 100th sentence in a ROM related to English.

Corresponding Japanese translated words are stored in the 100th sentence in another ROM related to Japanese. A further corresponding German translated word "GUTEN MORGEN." is stored in the 100th sentence in a further ROM related to German.

Similarly a specific numbered word in a ROM corresponds to a translated word of the same number in another ROM.

Translation by the translator is performed by finding the number of a word or a sentence in the mother tongue ROM and in detecting a translated word or sentence having the same number in the foreign tongue ROM.

The translation operation comprises the following steps:

(i) the first step: selecting the ROM of the mother tongue (ii) the second step: detecting the number of a word or a sentence in the thus selected ROM (iii) the third step: selecting another ROM of the foreign tongue, and (iv) the fourth step: detecting a translated word or a translated sentence having the same number in the other ROM.

(3) Translation of a Specific Sentence with Selection of a Catagory:

With reference to FIG. 1, keys specified $L_1$ through $L_{14}$ are category selection keys. If necessary, a picture suggesting the kind of category may be provided adjacent each category selection key. Selection by each of these keys is enabled following actuation of an SN/WD key 41 where the indicator 5 indicates the mark "▼".

A SRC key 42 is actuated for searching sequentially a plurality of sentences belonging to the same category. After the last sentence in the category is outputted, the first sentence in this category is to be addressed. When a sentence is addressed, the number of this sentence is outputted. A TRL key 43 is actuated for enabling the third step and the fourth step as described in item 2 to provide translation of this sentence.

Translation of a specific sentence with selection of a category is enabled according to the following steps:
(i) the first step: selecting a ROM of the mother tongue
(ii) the second step: illuminating the mark "▼" by actuating the key 41
(iii) the third step: actuating one of the category keys $L_1$ through $L_{14}$
(iv) the fourth step: addressing sequentially by the SRC key 42 so that the number of the specific sentence is detected and the translation key 43 is actuated
(v) the fifth step: selecting another ROM of the foreign tongue
(vi) the sixth step: detecting a translated sentence having the same number in the other ROM (4) Translation of an Inputted Word:

Spelling of a word is entered by actuating letter keys 44 and the translation key 43 is actuated to provide translation from the mother tongue to the foreign tongue as indicated in the indicator 4. Different situations may occur depending on the type of word entered as follows.
(i) the word entered is not found in the ROM of the mother tongue
(ii) only one word identical with the word entered is present in the ROM of the mother tongue.
(iii) a plurality of words identical with the word entered are present in the ROM of the mother tongue In connection with item (i), no word is memorized which is identical with the entered word. This is indicated by a double exclamation mark "!!" following the end of the entered word which is displayed after actuation of the translation key 43.

In connection with item (ii), the number of the identical word in the ROM of the mother tongue is detected and selection of a ROM having the foreign tongue is enabled, and a translated word having the same number in the selected ROM of the foreign tongue is detected and displayed.

More particularly, it is supposed that English is selected as the mother tongue and Japanese is selected as the foreign tongue. A word "SEE" is entered and the translation key 43 is actuated. Under the circumstances, the first word in the English ROM is addressed so that equivalency between the entered word and the first word is determined. If there is no equivalency, a counter for storing the number of the word is advanced by one to address the second word. If the word "SEE" is located at number 500 in the English ROM, by advancing the address of the counter up to the number 500, equivalency is detected. The Japanese ROM is then selected so that a translated word is developed by specifying the number 500 of the Japanese ROM. Translation is thus enabled.

In connection with item (iii), these homonyms are noted in the memorized format as indicated in FIG. 5. A specific concrete meaning is determined by the operator of the translator. A specific display with a note and a mark "!?" following the entered word is enabled to indicate that the entered word corresponds to a plurality of translated words.

In particular, a word "WATCH" of FIG. 5 is assumed to be entered. Firstly, this word is entered and when the translation key 43 is actuated the following is indicated.

ti "WATCH (CLOCK) !?".

Now the search key 42 is actuated to indicate another translated word equivalent to the word "WATCH".

"WATCH (SEE) !?"

While either of these alternative displays is displayed, the translation key 43 is actuated to obtain a corresponding translated word. At the same time, when the homonym is entered, the indicator 5 illuminates the symbol "▼" directed to MT indicating that there are one or more additional translated words equivalent to the entered word.

(5) Translation of two or more entered words:

The instant translator can translate two or more entered words. During input, the space key 45 is actuated to separate these words from one another. When the first word is entered and the space key 45 is actuated, the second word can be entered if the first word entered is contained in the ROM of the mother tongue. If the first word is not stored in the ROM or is a homonym, operation similar to items (i) and (iii) is conducted.

Under the circumstances that all of the words "I", "AM", "A" and "BOY" are assumed to be memorized in the English ROM, entry operation of "I", "SPC", "AM", "SPC", "A", "SPC" and "BOY" is conducted to indicate in the display 3.

"I AM A BOY".

Upon actuation of the translation key 43, translated words are obtained in the display 3 while the order of the translated words is identical to the order of the entered words. That is, regardless of the correct grammatical order in the translated tongue, the translated words corresponding to the entered words are aligned in the same order. The star "*" is indicated in the indicator 5 representing this situation.

(6) Entry of words with the brackets and translation thereof:

With reference to FIG. 8(*a*), an exemplary sentence "A LITTLE MORE (MILK) PLEASE." is input to display "A LITTLE MORE ((MILK)) PLEASE." Upon actuation of the translation key 43, a translated sentence which is stored in the format of FIG. 8(*d*) in the Japanese version, is indicated in which a translated word corresponding to "((MILK))" is indicated with a single bracket.

Alternately, when the exemplary English sentence is input, a word "COFFEE" is entered by the alphabetical keys to indicate "A LITTLE MORE ((COFFEE)) PLEASE."

Upon actuation of the translation key 43, a corresponding translated sentence is formed and displayed only on the condition that the word "COFFEE" is memorized in the English ROM. If not, operation similar to item (i) or (iii) of item (4) should be conducted.

Modification and translation of the word provided with the brackets are effected follows:

A sentence with the brackets is addressed by following the first to the fourth steps of item (3):

(v) the fifth step: the word contained within the brackets in the addressed sentence is replaced by the word entered before the translation key 43 is actuated (iv) the sixth step: in the ROM of the mother tongue, a word equivalent to the entered word is detected and the number thereof is detected In the case where such a word can not be detected in the ROM or there are two or more words having the spelling of the entered word, operation is similar to item (i) or (iii) of item (4). The following steps should be effected corresponding to item (ii) of item (4).

(vii) the seventh step: selecting the ROM of the foreign tougue (viii) the eighth step: extracting a sentence having the same number as the memorized number from the ROM of the foreign tongue so that the sentence is applied to the buffer register. The $C_{11}$ code or the $C_{12}$ code is also applied to the buffer register.

(iv) the ninth step: extracting the word having the same number as that of the word which is detected in the sixth step and inserting the extracted word between the brackets represented by the bracket code applied to the buffer register in the eighth step With respect to the sentence having the two kinds of brackets, the bracket key 46 is actuated for inserting a desired word between the brackets. The following sentence is exemplified.

"I WANT ((2)) TICKETS TO (TOKYO)"

The former brackets are displayed as double brackets while the latter ones are displayed as a single bracket. An entered word or phrase is inserted between the double brackets. Upon actuation of the bracket key 46, the single bracket is replaced by the double brackets while the double brackets are replaced by the single bracket. Thus, the word contained in the latter and double brackets can be replaced by a new entered one. Position of the double brackets is changed each time the bracket key 46 is actuated. Translation of the entered word or phrase is conducted by the manner as described above.

(7) Retaining the word without translation:

A holding key 47 referred to as HLD is actuated for identifying a person's name or a proper noun which should not be translated. Actuation of the holding key 47 follows entry of this kind of word. Even when the translation key 43 is actuated, this kind of word is not translated. If the translation key 43 is actuated following entry of this kind of word, the double exclamation mark is added to the end of the entered word, which is indicated, as described in item (4). In such a case, the translation key 43 is further actuated, the above holding operation is effective in the same manner as in the case of actuation of the holding key 47.

(8) Automatically retaining the entered word without translation:

FIGS. "0" through "9" and symbols "$", "." (period) ":" (colon), and "?" (question mark) are not subjected to translation under the condition that they are not added to any other words. It is not necessary to actuate the holding key 47.

(9) Addressing words classified in the categories:

As shown in FIG. 4(*a*), the words are classified as 47 categories so that each of the words can be addressed in the similar manner as in the case of addressing each of the sentences according to the kind of category.

(10) Searching each word entered by the keyboard:

Each word entered by the keyboard can be random accessed according to its spelling.

[KEY OPERATION IN THE TRANSLATION]

A. Translation of a single word entered is conducted by key operation as referred to tables 2 through 6 in which case English is the mother tongue and German is the foreign tongue so that the indicator 4 displays as follows:

TABLE 2

| ▲ ENG ▼ GER<br>Key Operation | Letter Display |
|---|---|
| "TREE" "TRL" | BAUM |
| "TRL" | TREE |
| "TRL" | BAUM |

TABLE 3

| Key Operation | Letter Display |
|---|---|
| "TREES" "TRL" | TREES!! |
| "SRC" | TREE !? |
| "TRL" | BAUM |
| "TRL" | TREE |

TABLE 4

| Key Operation | Letter Display |
|---|---|
| "TRE" "TRL" | TRE!! |
| "E" | TREE |
| "TRL" | BAUM |
| "TRL" | TREE |

TABLE 5

| Key Operation | Letter Display | Symbol Display |
|---|---|---|
| "LOVE" "TRL" | (THE) LOVE!? | |
| "SRC" | (TO) LOVE!? | ▼ |
| "TRL" | LIEBEN | MT |
| | | ▼ |
| "TRL" | (TO) LOVE | MT |

TABLE 6

| Key Operation | Letter Display |
|---|---|
| "ABC" "TRL" | ABC !! |
| "TRL" | ABC |
| "TRL" | ABC |

Table 2

After a word is entered and the translation key 43 referred to as "TRL" is actuated, translation from the mother tongue to the foreign tongue as specified in the indicator 4 is conducted. The translation key 43 is additionally actuated to thereby indicate the entered word of the mother tongue.

Tables 3 and 4

The double exclamation mark "!!" is added to indicate that no word having the same spelling as the entered word is present in the mother tongue ROM. The search key 42 is actuated to display a word having a spelling which is the nearest to the spelling of the entered word from the mother tongue ROM. Such a word is followed by the mark "!?" when displayed. This questions whether this word is intended by the operator.

Table 5

In case where the entered word has many homonyms, the translation key 43 is actuated and the entered word, a note and the mark "!?" is displayed. Upon actuation of the search key 42, the entered word with another type of note and the mark "!?" is displayed. When an intended word is displayed, the translation key 43 is actuated. The word "LOVE" is a noun and a verb so that the word as the noun is displayed as "(THE) LOVE!?" and the word as the verb is displayed as "(TO) LOVE!?".

Table 6

The word "ABC" is not memorized in the mother tongue ROM. This word is assumed to be a proper noun so that this word is not subjected to translation.

B. Translation of a plurality of words entered is conducted by key operation as referred to tables 7 and 8 in which case English is the mother tongue and Japanese is the foreign tongue so that the indicator 4 displays as follows;

TABLE 7

| ▲ ENG Key Operation | ▼ JPN | Letter Display |
|---|---|---|
| "A" | "SPC" | A- |
| "BIG" | "SPC" | A BIG - |
| "TREE" | "TRL" | ヒトツノ オオキイ キ(ジュモク) |
| "TRL" | | A BIG TREE |

TABLE 8

| Key Operation | | Letter Display |
|---|---|---|
| "I" | "SPC" | I - |
| "LOVE" | "TRL" | I(THE) LOVE!? |
| "SRC" | | I(TO) LOVE !? |
| "SPC" | | I(TO) LOVE - |
| "YOU" | "TRL" | ワタシ アイスル アナタ |
| "TRL" | | I(TO) LOVE YOU |

The space key 45 is used to input several words to obtain translated words. Even if this key is actuated, the entered word is displayed as such. But translation is enabled in the inner circuit. The meanings of adding the marks "!!" and "!?" are similar to the case of item A. The star "*" is necessarily indicated when translating several words to translated words since the translated words are not rearranged to provide a proper sentence in a grammatical sense.

C. Retaining entered words without translation is effected as referred to tables 9 and 10 in which case English is the mother tongue and German is the foreign tongue.

TABLE 9

| Key Operation | | Letter Display |
|---|---|---|
| "I" | "SPC" | I - |
| "GO" | "SPC" | I GO ON !? |
| | "SPC" | I GO !? |
| | "SPC" | I GO - |
| "TO" | "SPC" | I GO TO - |
| "OSAKA" | "HLD" | I GO TO OSAKA - |
| "TRL" | | ICH GEHEN ZU OSAKA |

TABLE 10

| Key Operation | Letter Display |
|---|---|
| | I GO TO OSAKA - |
| "TRL" | I GO TO OSAKA !! |
| "TRL" | ICH GEHEN ZU OSAKA |

In the example of table 10, in place of the holding key 47, the translation key 43 is actuated so that the mark "!!" is indicated to represent that the word "OSAKA" is not stored in the mother tongue ROM. When this key 43 is further actuated to thereby hold this word "OSAKA", the same display as table 9 is enabled as can be seen in table 10.

D. Automaticaly retaining of entered words without translation is shown in table 11 in which the mother tongue and the foreign tongue are like the example of tables 9 and 10.

TABLE 11

| Key Operation | | Letter Display |
|---|---|---|
| "A.M." | "SPC" | A.M. - |
| "7:30" | | A.M. 7:30 - |
| "TRL" | | A.M. (VORMITTAG) 7:30 |

E. The operation for addressing exemplary sentences and translation thereof is indicated in table 12. in which English is the mother tongue and Japanese is the foreign tongue.

TABLE 12

| Key Operation | Letter Display |
|---|---|
| SN/WD | |
| "Z" | GOOD MORNING. |
| "SRC" | GOOD AFTERNOON. |
| "SRC" | GOOD EVENING. |
| . | . |
| . | . |
| . | . |
| "SRC" | GOOD LUCK. |
| "TRL" | ゴキゲンヨウ。 |
| "SCR" | SEE YOU LATER. |

The SN/WD key 41 is actuated and the mark " " is indicated above the sentence selection mark "SN" and for permitting one of the category keys to be selected. One of the category keys is actuated to select one corresponding category. The first sentence of the selected category is addressed and displayed. The mark specified above the "SN" position is deleted in response to actuation of one of the category keys. The "SRC" Key 42 is actuated to sequentially address the sentences in the selected category.

When a desired one of the sentences is addressed and indicated, the "TRL" key 43 is actuated to provide translation. The "SRC" key 42 is further actuated to address the next sentence. Therefore, each time the key 42 is operated, further sentences are addressed and displayed. When the "SRC" key 42 is operated when displaying the last sentence of the category, the first sentence in the category is addressed and displayed again.

Any sentence with a word provided within brackets is addressed and indicated in the same manner as a sentence free of a word within brackets. Translation of a sentence with word provided within the brackets is always correct in the grammatical sense so that the indicator 5 does not illuminate the mark "*" illuminated.

F. Entry of a word into any sentence with a word provided within brackets and translation of the thus modified sentence are conducted as shown in tables 13 through 17. English is the mother tongue and Japanese is the foreign tongue in tables 13, 14 16 and 17. Japanese is the mother tongue and English is the foreign tongue in table 15.

TABLE 13

| NO | Key Operation | Letter Display |
|---|---|---|
| 1 | after access of an exemplary sentence | MAY I HAVE ((MILK))? |
| 2 | "C" | MAY I HAVE ((C-))? |

TABLE 13-continued

| NO | Key Operation | Letter Display |
|---|---|---|
| 3 | "O" | MAY I HAVE ((CO-))? |
| 4 | "F" | MAY I HAVE ((COF-))? |
| 5 | "F" | MAY I HAVE ((COFF-))? |
| 6 | "E" | MAY I HAVE ((COFFE - ))? |
| 7 | "E" | MAY I HAVE ((COFFEE-))? |
| 8 | "TRL" | (コーヒー) ヲ クダサイ. |
| 9 | "TRL" | MAY I HAVE ((COFFEE))? |
| 10 | "T" | MAY I HAVE ((T - ))? |
| 11 | "E" | MAY I HAVE ((TE-))? |
| 12 | "A" | MAY I HAVE ((TEA-))? |
| 13 | "TRL" | (オチャ) ヲ クダサイ. |

TABLE 14

| No. | Key Operation | Letter Display |
|---|---|---|
| 1 | after access of an exemplary sentence | I WANT ((2)) TICKETS TO (PARIS). |
| 2 | "3" | I WANT ((3)) TICKETS TO (PARIS). |
| 3 | "( )" | I WANT (3) TICKETS TO ((PARIS)). |
| 4 | "LON-DON" | I WANT (3) TICKETS TO ((LONDON)). |
| 5 | "TRL" | (ロンドン) ユキ ノ キップ ガ (3) マイ ホシイ. |

TABLE 15

| No. | Key Operation | Letter Display |
|---|---|---|
| 1 | after access of an exemplary sentence | (チズ) ハ ドコデ カエマスカ. |
| 2 | " " | (ハナ_) ハ ドコデ カエマスカ. |
| 3 | "TRL" | (ハナ(カオ)!!) ハ ドコデ カエマスカ. |
| 4 | "SRC" | (ハナ(ショクブツ)!!) ハ ドコデ カエマスカ. |
| 5 | "TRL" | WHERE CAN I BUY (FLOWER)? |
| 6 | "TRL" | (ハナ(ショクブツ)) ハ ドコデ カエマスカ. |

TABLE 16

| No. | Key Operation | Letter Display |
|---|---|---|
| 1 | after access of an exemplary sentence | WHERE CAN I BUY ((A MAP))? |
| 2 | "FLOWER" | WHERE CAN I BUY ((FLOWER))? |
| 3 | "TRL" | WHERE CAN I BUY ((FLOWER!!))? |
| 4 | "SRC" | WHERE CAN I BUY ((FLOWER!?))? |
| 5 | "TRL" | (ハナ(ショクブツ)) ハ ドコデ カエマスカ. |

TABLE 17

| No. | Key Operation | Letter Display |
|---|---|---|
| 1 | after access of an exemplary sentence | DOES ((THIS TRAIN)) STOP AT (KYOTO)? |
| 2 | "THAT" "SPC" | DOES ((THAT-)) STOP AT (KYOTO)? |
| 3 | "AIRPLAN" | DOES ((THAT AIRPLAN-)) STOP AT (KYOTO)? |
| 4 | "( )" | DOES ((THAT AIRPLAN!!)) STOP AT (KYOTO)? |
| 5 | "E" | DOES ((THAT AIRPLANE)) STOP AT (KYOTO)? |
| 6 | "( )" | DOES (THAT AIRPLANE) STOP AT ((KYOTO))? |
| 7 | "OSAKA" "HLD" | DOES (THAT AIRPLANE) STOP AT ((OSAKA))? |
| 8 | "TRL" | (アレ(アノ)ヒコウキ) ハ (OSAKA) ニ トマリマスカ. |

Table 13

The sentence having the word within the brackets is addressed in the manner similar to that described in item E. After access of an exemplary sentence, a word is inputted to delete the word within the double brackets so that the word is replaced by the entered word. When the modified sentence with the double brackets is translated, the double brackets are changed to the single bracket in which no word is inserted into the single bracket.

When the word within the brackets in the original sentence is replaced, inflection at the end of the entered word is not determined and sometimes there is error the grammatical sense. To indicate this possibility, the star "*" is indicated in the indicator 5. In table 13, this symbol is illuminated during and after NO. 8.

Table 14

The number of bracketed words to be contained in a sentence is at most two in which the former brackets are represented as double and the latter brackets are represented as a single. In response to actuation of the bracket key 46, the double brackets are changed to the single bracket and the single bracket is changed to the double brackets. Each time this key 46 is operated, the position of the double brackets is altered. The word contained within the double brackets, whether they are positioned at the former or the latter, can be replaced. At No. 5 in table 14, the star mark is indicated.

Tables 15 and 16

These are cases where the entered word to be contained within the double brackets is not found in the mother tongue ROM or the entered word has many translated words. These cases are processed in the same manner as items A and B. The star symbol is illuminated during and after No. 5 in table 15 and illuminated at No. 5 in table 16.

Table 17

This is a case of retaining the entered words without translation automatically or selectively as those of items C and D. The star symbol is indicated at No. 8 in table 17.

G. Translation of words among three kinds of tongues is accomplished as described in tables 18 and 19.

TABLE 18

| Key Operation | the kind of tongue indication | | |
|---|---|---|---|
| | ENG | GER | JPN |
| | ▲ | ▼ | |
| "▲▼" | ▼ | ▲ | |
| "▲▼" | ▲ | ▼ | |
| "LNG" | | ▲ | ▼ |
| "▲▼" | | ▼ | ▲ |
| "▲▼" | | ▲ | ▼ |
| "LNG" | ▼ | | ▲ |
| "▲▼" | ▲ | | ▼ |
| "▲▼" | ▼ | | ▲ |
| "LNG" | ▲ | ▼ | |
| "▲▼" | ▼ | ▲ | |
| "LNG" | ▲ | | ▼ |
| "LNG" | | ▼ | ▲ |
| "LNG" | ▼ | ▲ | |

TABLE 19

| | | the kind of tongue indication | | |
|---|---|---|---|---|
| Key Operation | Letter Display | ENG | GER | JPN |
| after access of an exemplary sentence | MAY I HAVE ((MILK))? | ▲ | | ▼ |
| "COFFEE" | MAY I HAVE ((COFFEE))? | ▲ | | ▼ |
| "TRL" | (コーヒー) ヲ クダサイ. | ▲ | | ▼ |
| "TRL" | (コーヒー) ヲ クダサイ. | | ▼ | ▲ |
| "TRL" | DARF ICH BITTE (KAFFEE) HABEN? | | ▼ | ▲ |
| "TRL" | (コーヒー) ヲ クダサイ. | | ▼ | ▲ |

Table 18

Selection of the mother tongue and the foreign tongue is enabled with the reversible key 48 and the tongue key 49. The mother tongue is specified with the mark "▲" and the foreign tongue is specified with the mark "▼".

Table 19

Translation of a word, a plurality of words and an exemplary sentence among three kinds of tongues is accomplished by alternating the mother tongue and the foreign tongue and the translation operations as described in items A through F.

H. Access of words from the ROM in a category and translation thereof are enabled as shown in tables 20 and 21.

TABLE 20

| Key Operation | Letter Display | Symbol Display | |
|---|---|---|---|
| "SN/WD" | | ▼ SN | |
| "SN/WD" | | | ▼ WD |
| "c" | AIRPLANE | | |
| "SRC" | INTERNATIONAL | | |
| "TRL" | コクサイテキナ | | |
| "SRC" | DOMESTIC | | |
| : | : | | |
| "SN/WD" | | ▼ SN | |
| "SN/WD" | | | ▼ WD |
| "T" | SIGHTSEEING | | |
| "SRC" | TRIP | | |
| "SRC" | TRAVEL | | |
| : | : | | |

TABLE 21

| Key Operation | Letter Display | Symbol Display | |
|---|---|---|---|
| "ZOO" | ZOO | | |
| "SN/WD" | ZOO | ▼ SN | |
| "SN/WD" | ZOO | | ▼ WD |
| "SRC" | ZOO | | |
| "SRC" | LION | | |
| "SRC" | TIGER | | |
| "TRL" | トラ | | |
| "SRC" | BEAR | | |
| : | : | | |

Table 20

As described above, all the words are classified as 47 categories. The words in the first 14 categories can be addressed in the same manner as the sentences. After translation is enabled with the translation key 43, the search key 42 is operated to address the next word.

Table 21

Any words belonging to the category to which the presently-entered word belongs can be subsequently addressed.

I. The operation for searching any word or words having the same spelling as an entered word is indicated in table 22.

TABLE 22

| Key Operation | Letter Display |
|---|---|
| "STA" | STA |
| "SRC" | STATION (TRAIN)!? |
| "SRC" | STAY (HOTEL)!? |
| "SRC" | STATUE!? |
| "SRC" | STAIRS? |
| "TRL" | カイダン(イエ) |
| "TRL" | STARIS !? |
| "SRC" | START!? |
| : | : |
| "SRC" | STAR!? |
| "SRC" | STATION (TRAIN)!? |

As shown in table 22, all the words having the same spelling as that of the entered word are addressed in a ramdom scheme. The homonyms having the same spelling as that of the entered word are addressed in succession. After all the words are addressed, the first word having this type of spelling is accessed. The translation key 43 is depressed to enable translation and is further operated to return to the mother tongue word in which case the search key 42 is operated to enable search operation.

TABLE 23

| Key Operation | Letter Display |
|---|---|
| "STAAAA" | STAAAA |
| "SRC" | STAA◊ |
| | STA◊ |
| | START!? |
| "SRC" | STATION(TRAIN)!? |
| "SRC" | STAY(HOTEL) !? |
| "SRC" | STATUE |

Below the contents of table 23, the search operation is held depending on the spelling "STA". "◊" is a mark for representing performance of the search operation. During the search operation, the "C/ON" key may be used to stop the search operation.

As shown in table 23, when the entered word for the search operation consists of four or more letters, only the first four letters are subjected to the search operation so that all the words containing these four letters are to be addressed. If no word is present containing the same letters as that of the entered word, the number of letters subjected to the search operation is decreased by one for the purpose of the search operation.

Figure 9:
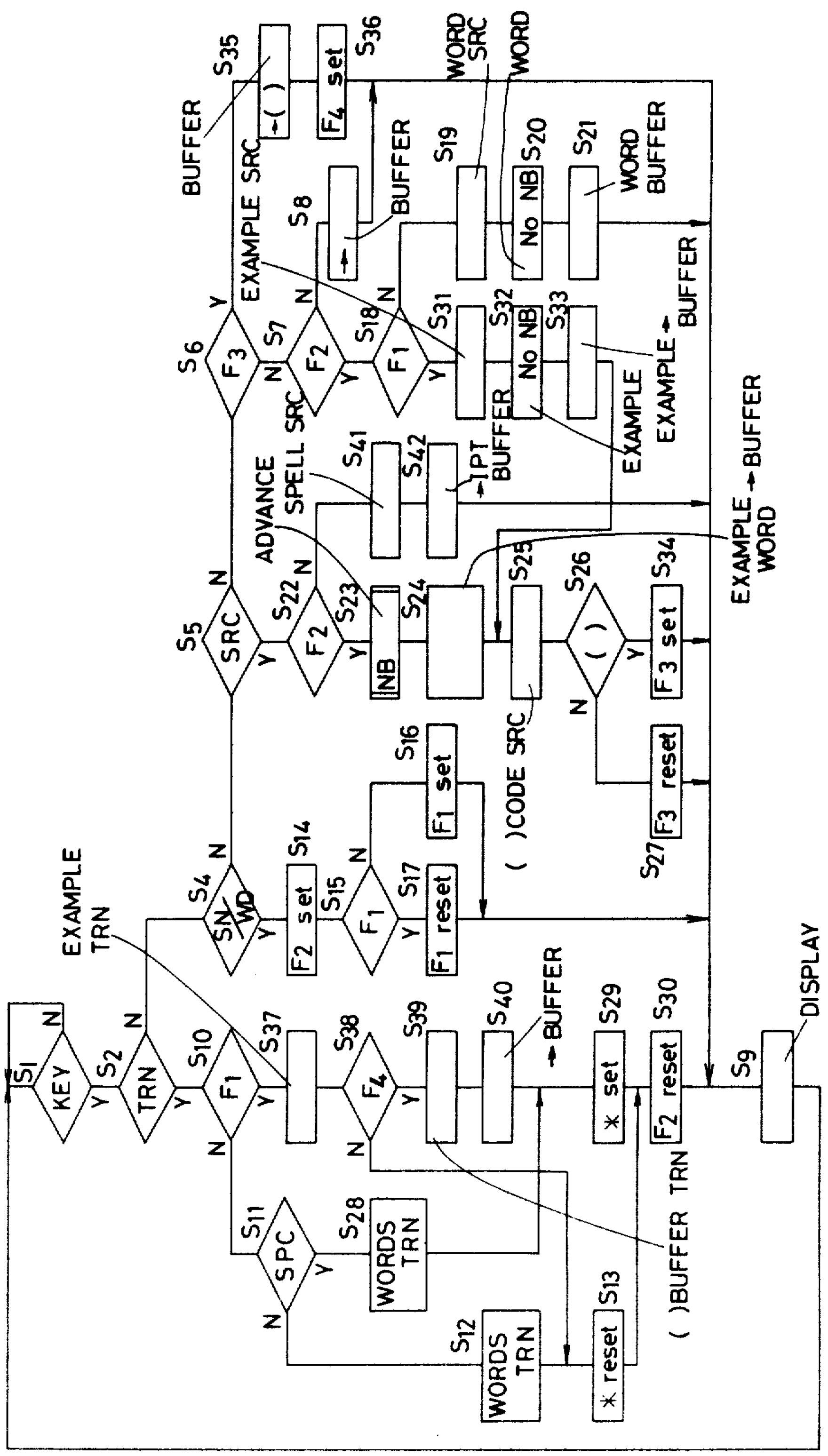

FIG. 9 shows a flow chart according to which the present translator is operated. In FIG. 9, $F_1$ through $F_4$ indicate flags for storing the respective conditions, the flags being constructed as parts of the data RAM in FIG. 3(*a*). The flag $F_1$ is provided for representing the sentence mode. $F_2$ is for representing the category selection search mode. $F_3$ is for representing that the sentence addressed contains one or more brackets. $F_4$ represents that the word within the brackets is replaced by a new word.

(1) Translation of an entered word (ii) Entry of a word

When a word is inputted with the keyboard, $S_1 \rightarrow S_2 \rightarrow S_3 \rightarrow S_5 \rightarrow S_6 \rightarrow S_7 \rightarrow S_8$ are enabled so that codes representing letters of the word are entered to the buffer and $S_9$ is selected to provide display of the letter. With repetition of the key operations, a plurality of letters contained in the word are entered to the input buffer.

The translation key 43 is depressed to accomplish translation of the entered word. $S_{10}$ is enabled to detect the condition stored in $F_1$. Since what is to be translated is not a sentence but a word, $F_1$ is made reset to lead to $S_{11}$. $S_{11}$ is used to detect whether a space is present in the contents of the input buffer. No space is present because the input is a single word. $S_{12}$ is enabled to accomplish translation.

$S_{13}$ is executed to reset a star symbol flip flop "*". This flip flop of 1 bit is contained with the RAM 30 of FIG. 3(*b*). By making the flip-flop "*" set, the star symbol is illuminated in the indicator 5. By making it reset, it is made dark.

(ii) Search of one of the categories is enabled by selecting one of the categories and sequentially addressing the words by actuation of the search key 42. When a desired word is indicated, the translation key 43 is actuated to enable translation of the words.

Firstly, $F_1$ is reset so that the "SN/WD" key 41 is twice operated to select the word mode with $S_4 \rightarrow S_{14} \rightarrow S_{15} \rightarrow S_{16} \rightarrow ... S_4 \rightarrow S_{14} \rightarrow S_{15} \rightarrow S_{17} \rightarrow ...$ . $F_2$ is set and $F_1$ is reset. One of the category keys $L_1$ to $L_{14}$ is operated to indicate the first word of one of the categories. The first indicates the subject of the category selected.

For this purpose, $F_3$ is reset to thereby enables $S_1 \rightarrow . . . \rightarrow S_6 \rightarrow S_7 \rightarrow S_{18} \rightarrow S_{19}$. $S_{19}$ is operated to detect the first word in the selected category. After retrieval, the number of the word is memorized by the buffer NB ($S_{20}$) and the retrieved word is entered to the input buffer ($S_{21}$).

By repeating actuation of the search key 42, the words in the category are sequentially addressed as reffered to $S_1 \rightarrow . . . \rightarrow S_5 \rightarrow S_{22} \rightarrow S_{23} \rightarrow S_{24}$. $S_{23}$ is executed to increase the count of the contents of NB by one. $S_{24}$ is operated to extract the word of the number corresponding to the contents of NB from the mother tongue ROM. Whether the bracket code is present within the contents addressed is detected with $S_{25} \rightarrow S_{26}$. Only the word is addressed when no bracket code is detected. $F_3$ is reset in $S_{27}$.

The translation key 43 is operated to provide translation of the retrieved word. $S_{12}$ and $S_{13}$ are conducted to conduct the same operation as item (i).

Figure 10:
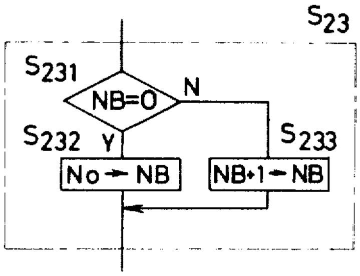
FIGS. 9 and 10 show flow charts of operation of a translator according to the present invention.

FIG. 10 is a detailed flow chart of $S_{23}$ of FIG. 9. $F_{231}$ is executed to detect whether the contents of NB are "0". If "0", $S_{232}$ is operated to detect the number of the word entered in the input buffer. The number is applied to the buffer NB. If not "0", $S_{233}$ is selected to add "+1" to the contents of NB.

Under the circumstance that NB stores "0", a word is directly applied where the "SN/WD" key 41 is twice operated to select the word mode. The search key 42 is operated to detect the number of the entered word. The number is memorized in NB. The display at this time is the entered word as shown in FIG. 9.

Thereafter, each item the search key 42 is depressed, the words in the category to which the entered word belongs are in turn accessed. By detecting the category separation code added to the end of each category, the first word in each category is assumed to be addressed.

According to this preferred form of the present invention, the words are searched such that a word entered with the keyboard selects a category to which the word belongs.

A similar operation can be enabled in connection with sentences in which a sentence entered with the keyboard selects a category to which the sentence belongs.

(2) Translation of a sentence (i) Translation of a plurality of entered words

Translation of a plurality of words entered with the keyboard is enabled to obtain a plurality of corresponding translated words. A sentence is entered with the keyboard to apply its contents to the input buffer as in the manner similar to that in item (1) (i). The translation key 43 is operated to execute $S_2 \rightarrow S_{10} \rightarrow S_n$. The space codes are necessarily contained for separating the words of the sentence. $S_{28}$ is enabled to provide translation from the words to equivalent words, directly. $S_{29}$ is operated to make the star flip flop set so that the star symbol is illuminated from and after $S_9$.

(ii) Addressing and translation of an exemplary sentence in a category selected and addressed in response to actuation of the search key The SN/WD key 41 is actuated the desired number of times to set $F_1$ in $S_{16}$ so as to provide the exemplary mode. One of the category keys $L_1$ through $L_{14}$ is actuated to provide address of the first sentence in a corresponding category and display it. For this purpose, $S_1 \rightarrow . . . \rightarrow S_6 \rightarrow S_7 \rightarrow S_{18}$ is selected so as to retrieve the first sentence in a selected category in $S_{31}$ because of set condition of $F_1$. $S_{32}$ is selected to apply the number of the addressed sentence to the buffer NB. $S_{33}$ is executed to transfer the addressed sentence to the input buffer. Detection is carried out as to whether the addressed sentence has the word within the brackets, that is, whether there are present the bracket codes. $F_3$ is set or reset as referred to $S_{25} \rightarrow S_{26} \rightarrow S_{34}(S_{27})$.

The search key is operated to sequentially address the sentences in the same category as referred to $S_1 \rightarrow . . . S_5 \rightarrow S_{22} \rightarrow S_{23} \rightarrow S_{23} \rightarrow . . ..$ Upon addressing any desired exemplary sentence, the translation key is operated to obtain a translated sentence having the same number as the original exemplary sentence. If the original sentence has any word or phrase within the brackets, the word or phrase can be replaced by operating necessary keys as referred to $S_1 . . . \rightarrow S_6 \rightarrow S_{35} \rightarrow S_{36}$.

$S_{35}$ is executed so that, while the original sentence is addressed, the word or phrase within the brackets of the sentence is an additional bracket buffer except for the input buffer and, then, the word or phrase is replaced by a newly entered word or phrase with key operation. $S_{37}$ is selected by operating the translation key to provide translation of the original exemplary sentence.

In the case of making a modified sentence by changing the contents within the brackets, $S_{36}$ is operated to set $F_4$ and $S_{39}$ is operated to translate the contents within the bracket buffer, and $S_{40}$ is executed to replace the translated contents within the brackets with new translated contents. In such a case, $S_{29}$ is selected to set the star symbol "*" so that the star symbol is indicated together with indication of the translated sentence at $S_9$.

When the original sentence does not have any word within the brackets or no modification of the word within the brackets is carried out, $S_{38} \rightarrow S_{13}$ is selected on account of reset condition of $F_4$ so that no indication of the star symbol is made.

$S_{41}$ is operated by entering a word with key operation and actuating the search key so that the entered word is searched. For this purpose, any word starting with same spelling as the entered word is retrieved from the word data in the mother tongue ROM. $S_{42}$ is executed to transfer the word having the same spelling to the input buffer.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic translator wherein a plurality of first words represented in a first language are entered to obtain a plurality of second words represented in a second language equivalent to the first words, comprising:

input means for entering the first words;

memory means for storing the second words;

access means operatively connected to and responsive to said input means for addressing said memory means for retrieving the second words and for providing the second words in an order which is identical to the order of the input first words; and indicating means responsive to said access means for indicating that the order of the second words is identical to the order of the first words.

2. The translator of claim 1, wherein said access means comprises a microcomputer including:

operational instruction means for containing and generating micro-instructions for controlling operations of the translator;

address registor means coupled to said operational instruction means for causing said operational instruction means to sequentially generate the micro-instructions;

central processor means responsive to the micro-instructions for decoding the micro-instructions and conducting the operations; and data memory means responsive to the central processor means for storing and generating data.

3. An electronic translator wherein at least one first word represented in a first language is entered to obtain at least one second word represented in a second language equivalent to the at least one first word, comprising:

input means for entering the at least one first word;

memory means for storing the second words in such a manner that a plurality of second words are classified according to common subject;

classification selection means for selecting the subject of the at least one input first word;

access means responsive to said input means and to said classification selection means for addressing said memory means for retrieving the at least one second word in accordance with a classification selected by said classification selection means; and output means responsive to said access means for outputting the at least one second word.

4. The translator of claim 3, wherein the first word of each classification contained in said memory means is a word for representing the subject of each classification.

* * * * *